United States Patent
Tambakuwala et al.

(10) Patent No.: US 12,526,234 B1
(45) Date of Patent: Jan. 13, 2026

(54) LOAD BALANCING USING BASE TRANSPORT HEADER

(71) Applicant: Juniper Networks, Inc., Sunnyvale, CA (US)

(72) Inventors: Himanshu Kumar Tambakuwala, Bengaluru (IN); Mahesh Kumar Subramaniam, Fremont, CA (US); Michal Styszynski, Antony (FR); Suraj Kumar, Bangalore (IN); Dmitry A. Shokarev, Mountain View, CA (US); Swamy Sadashivaiah Renu Kananda, Tracy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/397,408

(22) Filed: Dec. 27, 2023

(51) Int. Cl.
*H04L 47/34* (2022.01)
*H04L 45/74* (2022.01)
*H04L 47/125* (2022.01)

(52) U.S. Cl.
CPC ............ *H04L 47/125* (2013.01); *H04L 45/74* (2013.01); *H04L 47/34* (2013.01)

(58) Field of Classification Search
CPC ..... H04L 69/22; H04L 49/358; H04L 47/115; H04L 47/125; H04L 47/10; H04L 47/12
See application file for complete search history.

(56) References Cited

U.S. PATENT DOCUMENTS

| | | | | |
|---|---|---|---|---|
| 8,688,798 | B1* | 4/2014 | Lentini | H04L 67/1097 709/212 |
| 2023/0412518 | A1* | 12/2023 | Zheng | H04L 47/32 |
| 2024/0089194 | A1* | 3/2024 | Almog | H04L 45/66 |
| 2024/0214312 | A1* | 6/2024 | Ji | H04L 45/66 |

OTHER PUBLICATIONS

A. Montazerolghaem, M. H. Y. Moghaddam and A. Leon-Garcia, "OpenSIP: Toward Software-Defined SIP Networking," in IEEE Transactions on Network and Service Management, vol. 15, No. 1, pp. 184-199, Mar. 2018 (Year: 2018).*
H. Ren, H. Li, D. Liu, G. Xu and X. S. Shen, "Enabling Secure and Versatile Packet Inspection With Probable Cause Privacy for Outsourced Middlebox," in IEEE Transactions on Cloud Computing, vol. 10, No. 4, pp. 2580-2594, Oct. 1-Dec. 2022 (Year: 2022).*
Supplemental to InfiniBand Architecture Specification; InfiniBand Architecture Release 1.2.1, vol. 1—General Specifications; Annex A17: RoCEv2; Sep. 2, 2014; 23 pgs., InfiniBand Trade Association.
Microsoft / Freeflow, GitHub; downloaded Nov. 30, 2023; retrieved at https://github.com/microsoft/Freeflow/blob/master/libraries/libibverbs-1.2.1minx1/include/infiniband/opciode.h; 4 pgs.
Tom Shanley; InfiniBand Network Architecture; First Edition; MindShare, Inc.; 2002; 268 pgs.

(Continued)

*Primary Examiner* — Messeret F Gebre
(74) *Attorney, Agent, or Firm* — Harrity & Harrity, LLP

(57) ABSTRACT

In some implementations, a network device may receive a packet containing a base transport header (BTH). The network device may identify a value in the BTH. The network device may load-balancing, by the network device, the packet using the value in the BTH.

20 Claims, 8 Drawing Sheets

(56) References Cited

OTHER PUBLICATIONS

Dmitry Shokarev; "To spray or not to spray: Solving the low entropy problem of the AI/ML training workloads in the Ethernet Fabrics." published Aug. 28, 2023; downloaded Nov. 30, 2023; retrieved at https//www.linkedin.com/pulse/spray-solving-low-entropy-problem-aiml-training-fabrics-shokarev/; 10 pgs.

"Trouble on ConnectX5 & RoCE v2 on Linux programming" downloaded Nov. 30, 2023; retrieved at https://forums.developer.nvidia.com/t/trouble-on-connectx5-roce-v2-on-linux-programming/265317; 9 pgs.

Boundary / wireshark, GitHub; downloaded Nov. 30, 2023; retrieved at https://github.com/boundary/wireshark/blob/master/epan/dissectors/packet-inifniband.c; 146 pgs.

* cited by examiner

LOAD BALANCING USING BASE TRANSPORT HEADER

BACKGROUND

Load balancing may refer to an ability of a network device to balance network traffic across multiple links. For example, the network device can transmit network traffic over two or more links rather than over only a single link when more than one link is available. As a result, load balancing may help to prevent the single link from experiencing excessive network traffic.

SUMMARY

Some implementations described herein relate to a method. The method may include receiving, by a network device, a packet containing a base transport header (BTH). The method may include identifying, by the network device, a value in the BTH. The method may include load-balancing, by the network device, the packet using the value in the BTH.

Some implementations described herein relate to a network device. The network device may include one or more memories and one or more processors. The one or more processors may be to receive a remote direct memory access (RDMA) packet containing a BTH. The one or more processors may be to identify a value in the BTH. The one or more processors may be configured to load-balance, by the network device, the RDMA packet using the value in the BTH.

Some implementations described herein relate to a non-transitory computer-readable medium that stores a set of instructions. The set of instructions, when executed by one or more processors of a network device, may cause the network device to receive a packet containing a BTH. The set of instructions, when executed by one or more processors of the network device, may cause the network device to identify a value in an opcode field of the BTH. The set of instructions, when executed by one or more processors of the network device, may cause the network device to load-balancing, by the network device, the packet using the value in the BTH.

DETAILED DESCRIPTION

Figure 1:
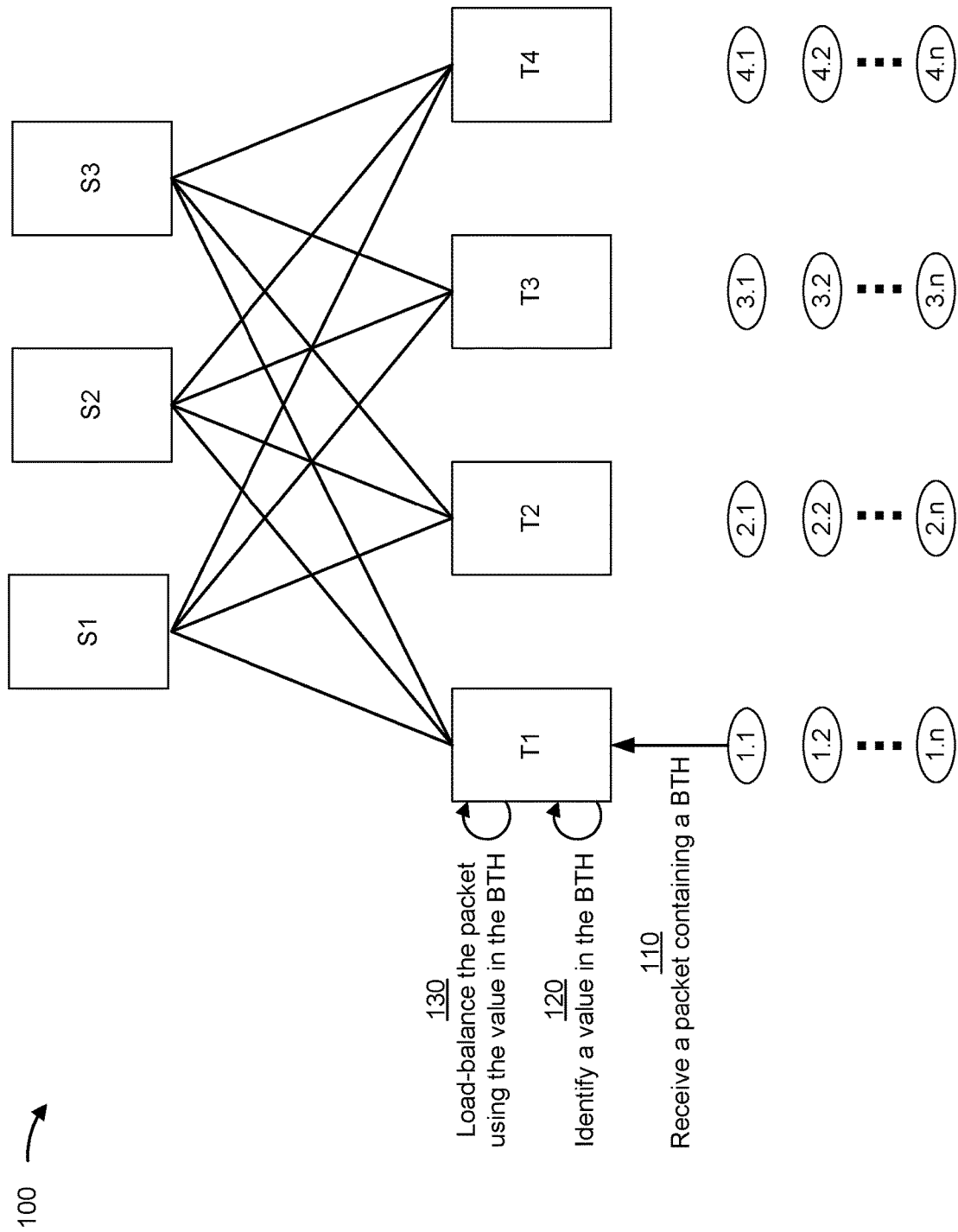
FIG. 1 is a diagram of an example implementation associated with load balancing using a BTH.

The following detailed description of example implementations refers to the accompanying drawings. The same reference numbers in different drawings may identify the same or similar elements.

Equal cost multipath routing (ECMP) may enable static load balancing (SLB) or dynamic load balancing (DLB). SLB is based on packet header contents, does not account for port quality (e.g., path quality, link quality, or the like), and fixes the selected path for the complete duration of the flow. Although avoiding packet reordering scenarios, SLB may lead to flow collisions, link saturation, suboptimal use of link bandwidth, or the like.

SLB may be unable to support artificial intelligence and/or machine learning (AI/ML) workloads. AI/ML applications may involve massive amounts of compute resources (e.g., computing resources) to complete a job. For example, a single graphics processing unit (GPU) may be insufficient to complete an AI/ML job. As a result, the job may be distributed to N GPUs, where N is greater than one. For example, each of the N GPUs may complete a small part of the job and communicate the result to the other GPUs that are working on the job. For example, the GPUs may exchange RDMA packets, which enable data transfer from random access memory (RAM) of one GPU to RAM of another GPU without involving an operating system. This synchronization between GPUs may enable the GPUs to complete a single job. Furthermore, GPUs may complete jobs sequentially (e.g., a subsequent job may be started after a previous job is completed). Thus, job completion time is an important factor for AI/ML applications, and any delays or dropped flows between GPUs can significantly impact job completion time. Therefore, AI/ML network fabrics target low latencies and few drops.

SLB may be unable to support AI/ML workloads because the entropy of AI/ML flows is low. For example, AI/ML workloads can generate small quantities of high-bandwidth (e.g., elephant) flows, such as flows that are hundreds of gigabytes. Because SLB does not account for port load (e.g., path congestion) in selecting an egress path, statically load-balanced AI/ML flows can experience frequent flow collisions, which can lead to high latency, low throughput, oversubscription, packet drops, retransmission of dropped frames, or the like. As a result, collisions can increase tail and/or network (tail/network) latency. Tail/network latency, which may be measured by the arrival time of the last byte(s) of a workload at a target, may ultimately impact job completion time. In some examples, on average, 30% of the elapsed time in an AI/ML workflow may be due to network delay. In traditional front-end networks that connect low-cost general-purpose servers, network utilization rates can drop to 50%.

Unlike SLB, DLB (which may also be referred to as "adaptive load balancing" or "global load balancing") may account for link quality. In particular, DLB is based on port quality, such as port load, queue size, or the like (e.g., a quality band associated with port quality may be assigned to the port), and accounts for port quality in selecting an outgoing egress ECMP member. The quality band of the port may change based on instantaneous port load and/or queue size. In some examples, DLB may not target down ports for ECMP hashing. Although optimizing link bandwidth and enabling hardware-based ECMP repair, DLB may lead to packets within a flow being received out-of-order (e.g., the packets may be received in a different order than the packets were transmitted).

For example, DLB operating in packet spray mode may increase the possibility of out-of-order packets. In packet spray mode, a network device applies DLB logic to each packet within a flow. Although ensuring that each packet is assigned to a highest-quality member port or link, thereby achieving an optimal utilization of available member link bandwidths, packet spray mode often leads to packet reordering scenarios because the packets are transmitted to a destination over different paths.

In some cases, network interface cards (NICs) may have the capability to reorder packets in elephant RDMA flows having certain operation code (opcode) values. Only select network traffic or flows may be tolerant to re-ordering, depending on the capability of the NIC. As a result, if a network device applies DLB, then the NIC at the receiving network device may be unable to re-order at least some of the packets, depending on whether the packets belong to a flow for which the NIC supports packet re-ordering. Furthermore, DLB may consume hardware resources (e.g., hardware resources on a destination NIC) when applied to small (e.g., mice) flows. Thus, the network device may instead apply SLB, which may, as discussed above, result in network capacity reduction due to imbalance of the flows and thereby increase job completion time in ML training clusters.

Some implementations described herein enable a network device to use certain packet characteristics, such as headers (e.g., BTHs) of packets, to load-balance network traffic. For example, the network device may inspect a packet (e.g., by performing deep packet inspection (DPI)), identify data (e.g., an opcode value) in a BTH of the packet, and use the data as a filter to perform DLB or SLB on a packet containing the BTH. The network device may use the BTH because the BTH, unlike headers above the BTH (e.g., Ethernet layer 2 (L2) header, internet protocol (IP) header, user datagram protocol (UDP) header, or the like) may contain parameters (e.g., the opcode field) that the network device can use to hash packets on a per-packet basis.

In some examples, the network device may enable DLB in packet spray mode for flows that one or more NICs are capable of handling out-of-order, and the network device may enable SLB for all other flows using the same ECMP as the DLB flows. In some examples, the network device may enable DLB in packet spray mode for elephant flows, and the network device may enable SLB for all other flows using the same ECMP as the DLB flows. For instance, if the network device routes mice flow 1, mice flow 2, and elephant flow 3 via an ECMP, each flow having a different RDMA opcode value, and the receiving NIC has the capability to re-order elephant flow 3, then the network device may enable DLB with packet spray mode for elephant flow 3 and SLB for mice flows 1 and 2.

As a result, the network device may improve (e.g., optimize) tail latency without consuming excessive hardware resources. By applying per-packet load balancing on certain flows based on destination NICs and/or workload type as identified by the BTH, the network device may reduce re-ordering issues. For example, the network device may reduce tail latency due to re-ordering by performing DLB on flows for which the destination NIC is capable of supporting re-ordering. Additionally, or alternatively, the network device may avoid starving of mice flows by enabling packet spraying for elephant flows. In some examples, enabling DLB with packet spray mode for elephant flows and SLB for mice flows may avoid re-ordering of mice flows, thereby reducing hardware resources consumed by the destination NIC. Therefore, in some examples, the network device may perform efficient ECMP load balancing for RDMA traffic (e.g., RDMA over converged Ethernet version 2 (RoCEv2) traffic) in an AI/ML fabric. Such network performance enhancements, including reducing tail latency, may increase a quantity of workloads and applications that may be run on AI infrastructure, which may help to approach an ideal scenario where an AI backend operates at a 100% utilization rate.

FIG. 1 is a diagram of an example implementation 100 associated with load balancing using a BTH. As shown in FIG. 1, example implementation 100 may include a GPUs 1.1-1.$n$, 2.1-2.$n$, 3.1-3.$n$, and 4.1-4.$n$, network devices T1-T4 (e.g., leaf nodes), and network devices S1-S3 (e.g., spine nodes). These devices are described in more detail below in connection with FIGS. 5-7.

The GPUs 1.1-1.$n$, 2.1-2.$n$, 3.1-3.$n$, and 4.1-4.$n$ may be configured to exchange packets (e.g., RDMA packets) via the network devices T1-T4 and S1-S3. For example, GPUs 1.1-1.$n$ may configured to communicate with network device T1, GPUs 2.1-2.$n$ may configured to communicate with network device T2, GPUs 3.1-3.$n$ may configured to communicate with network device T3, and GPUs 4.1-4.$n$ may configured to communicate with network device T4. Network devices T1-T4 may be configured to transmit the packets to others of network devices T1-T4 via network devices S1-S3.

As shown by reference number 110, the network device T1 may receive a packet containing a BTH. For example, the network device T1 may receive the packet from one of GPUs 1.1-1.$n$. The packet may be an RDMA packet destined to another GPU (e.g., one of GPUs 2.1-2.$n$, 3.1-3.$n$, or 4.1-4.$n$). For example, the packet may be RoCEv2 traffic for an AI/ML cluster.

As shown by reference number 120, the network device T1 may identify a value in the BTH. In some aspects, the value may be in an opcode field of the BTH. The opcode field may indicate metadata regarding an RDMA operation for the packet. For example, a value of the opcode field (e.g., an 8-bit value) may define the transport type of the packet (e.g., reliable connection, unreliable connection, reliable datagram, unreliable datagram, or the like), a message transfer operation type of the packet (e.g., send, RDMA write, send-only, RDMA write-only, or the like), or a position of the packet within a message (e.g., whether the packet is the first packet of the message, a middle packet of the message, the last packet of the message, the only packet of the message, or the like), among other examples. In some examples, the value may indicate that the packet is a write-only packet (e.g., an RDMA write-only packet).

In some aspects, the value may be a packet sequence number in the BTH. The packet sequence number (e.g., a 24-bit value) may indicate an order of the packet within a flow. For example, the packet sequence number may provide reliable transport.

In some examples, the network device T1 may generate a hash based on the identified value. For example, the network device T1 may generate a hash using the value in the opcode field. Additionally, or alternatively, the network device T1 may include the packet sequence number in the hash. For example, the network device T1 may include the packet sequence number in the hash for select RDMA packets (e.g., as determined based on the opcode).

As shown by reference number 130, the network device T1 may load-balance the packet using the value in the BTH. For example, the network device T1 may determine which spine node S1-S3 to which to transmit the packet based on the value in the BTH. For example, the network device T1 may use the field(s) of the BTH header (and/or further down the RDMA header) as a firewall filter match condition. Thus, the network device T1 may perform conditional load balancing and forwarding path selection based on the opcode field value, the packet sequence number, or the like.

In some aspects, the network device T1 may load-balance the packet by selecting a next-hop of the packet. For example, the network device T1 may perform the load-balancing at the next-hop level (e.g., by load-balancing over parallel next-hops). For example, the network device T1 may mark the packet as eligible for packet spraying and then override a standard next-hop selection (e.g., ECMP decision) that is made based on a random value.

In some aspects, the network device T1 may load-balance the packet by steering the packet to a forwarding instance. For example, the network device T1 may perform the load-balancing at the route level. For example, the network device T1 may steer traffic to a separate forwarding instance (e.g., through a firewall-based filter) that contains a parallel next-hop hierarchy and has packet spraying enabled. For example, the forwarding instance may forward the packet to the appropriate next-hop.

In some aspects, the network device T1 may perform a networking action on the packet using the value in the BTH and/or on another packet using a value in a BTH contained in the other packet. In some examples, the network device T1 may perform filter-based forwarding, rate limiting, monitoring, packet dropping, or the like. The network device T1 may perform the networking action based on match criteria provided herein (e.g., a value in a BTH, such as an opcode field value, a packet sequence number, or the like).

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
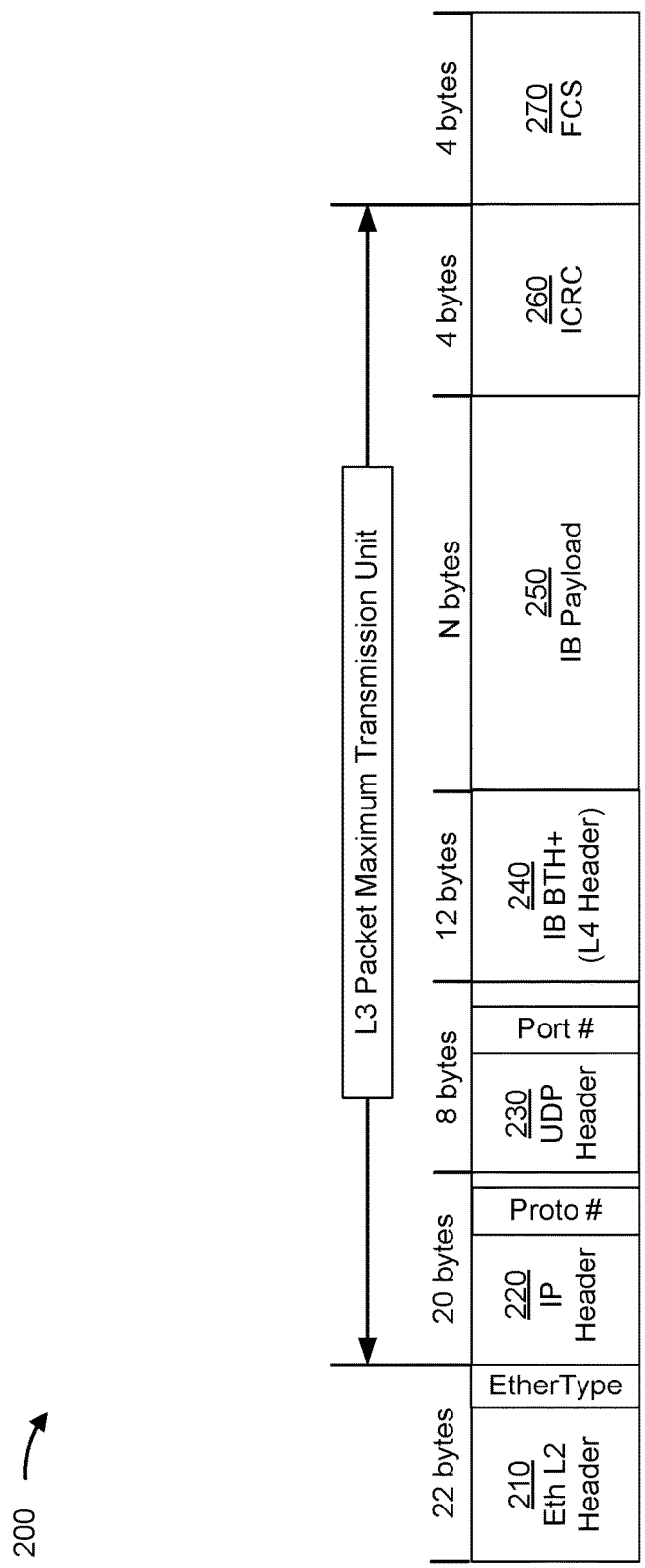
FIG. 2 is a diagram of an example packet that can be load-balanced using a BTH value in the packet.

FIG. 2 is a diagram of an example packet 200 that can be load-balanced using a BTH value in the packet 200.

In some examples, the packet 200 may be an RDMA packet, such as an RoCEv2 packet. As shown, the packet 200 may contain an Ethernet L2 header 210, an IP header 220, a UDP header 230, a BTH 240, a payload field 250, an invariant cyclic redundancy check (ICRC) field 260, and a frame check sequence (FCS) field 270.

The Ethernet L2 header 210 may contain an EtherType that indicates that the packet 200 is an IP packet (e.g., a routable RDMA over converged Ethernet (RoCE) packet). For example, the Ethernet L2 header 210 may indicate that the next header of the packet 200 is the IP header 220. The IP header 220 may contain an IP number that indicates that the packet 200 is a UDP packet. For example, the IP number may indicate that the next header of the packet 200 is the UDP header 230. The UDP header 230 may contain a port number. For example, the port number may be a UDP destination port number indicating that the next header of the packet 200 is the BTH 240. For example, the port number may be 4791.

As shown, the BTH 240 may be present above the UDP header 230. In some examples, the BTH 240 may be an RoCEv2 header. In some examples, the BTH 240 may be an InfiniBand™/SM (IB) BTH (e.g., an IB BTH+ layer 4 (L4) header). The BTH 240 may contain an opcode field, a packet sequence number, a destination queue pair field, an L2 partition key, or the like. In some examples, the opcode field may indicate that the transport type of the packet 200 is an unreliable datagram, and that the packet 200 is a send-only packet. The destination queue pair field may indicate a receiving end of a queue pair, and the L2 partition key may be similar to a virtual local area network (VLAN) identifier.

Like the BTH 240, the payload field 250 may be present above the UDP header. The payload field 250 (e.g., an IB payload field) may carry an RDMA transmission (e.g., from one GPU to another GPU). The ICRC field 260 may contain a hop-by-Ethernet-hop cyclic redundancy check (CRC). The FCS field 270 may be a 32-bit end-to-end ROCE FCS that offers protection beyond Ethernet FCS.

As indicated above, FIG. 2 is provided as an example. Other examples may differ from what is described with regard to FIG. 2.

Figure 3:
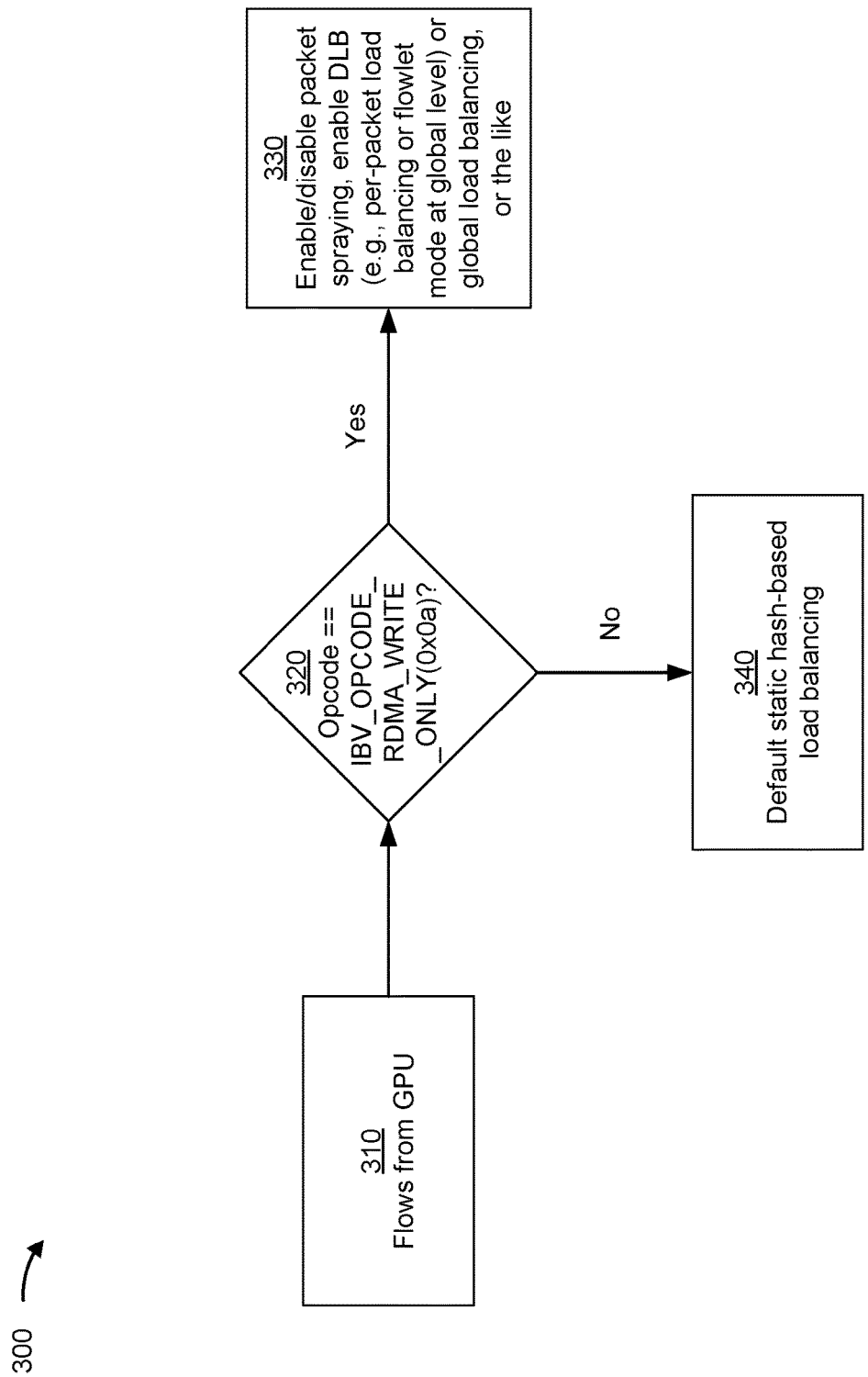
FIG. 3 is a flowchart of an example process for selectively enabling packet spraying based on a BTH match.

FIG. 3 is a flowchart of an example process 300 for selectively enabling packet spraying based on a BTH match.

As shown by reference number 310, a network device (e.g., network device T1) may receive flows from a GPU. The flows may contain packets (e.g., RDMA packets). As shown by reference number 320, for each packet, the network device may identify (e.g., determine or check) an opcode value in a BTH header of the packet.

A user may select different treatments for different match conditions (e.g., RDMA opcode values). As shown by reference number 330, upon detecting a match with the match condition (e.g., upon detecting that the opcode value indicates that the packet is a write-only packet), the network device may enable or disable packet spraying in per-packet fashion, enable DLB (e.g., per-packet load balancing, global-level flowlet mode load balancing, or the like) or global load balancing, or the like. In some examples, the check (e.g., the identification of the opcode value) may be part of a filter, and the match condition may prompt additional networking actions or options. As shown by reference number 340, if the opcode value does not indicate that the packet is a write-only packet, then the network device may perform default, hash-based SLB.

As indicated above, FIG. 3 is provided as an example. Other examples may differ from what is described with regard to FIG. 3.

Figure 4:
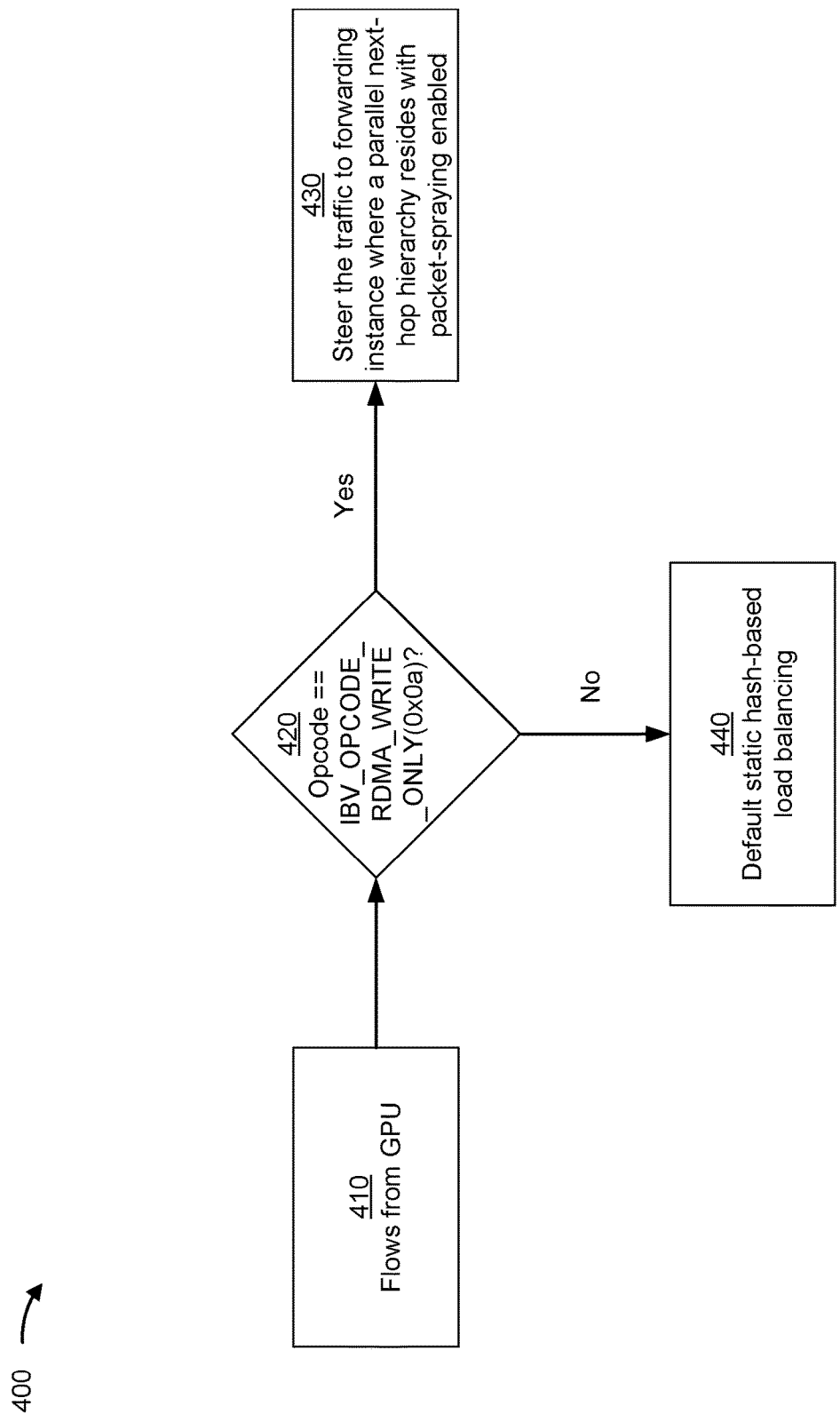
FIG. 4 is a flowchart of an example process for steering traffic to a forwarding instance based on a BTH match.

FIG. 4 is a flowchart of an example process 400 for steering traffic to a forwarding instance based on a BTH match.

As shown by reference number 410, a network device (e.g., network device T1) may receive flows from a GPU. The flows may contain packets (e.g., RDMA packets). As shown by reference number 420, for each packet, the network device may identify (e.g., determine or check) an opcode value in a BTH header of the packet.

A user may select different treatments for different match conditions (e.g., RDMA opcode values). As shown by reference number 430, upon detecting a match with the match condition (e.g., upon detecting that the opcode value indicates that the packet is a write-only packet), the network device may steer traffic to a forwarding instance (e.g., using filter based forwarding). For example, a parallel next-hop hierarchy may reside within the forwarding instance, and the forwarding instance may have packet-spraying enabled. Thus, the packet may be load-balanced on per-packet basis. In some examples, the check (e.g., the identification of the opcode value) may be part of a filter, and the match condition may prompt additional networking actions or options. As shown by reference number 440, if the opcode value does not indicate that the packet is a write-only packet, then the network device may perform default, hash-based SLB.

As indicated above, FIG. 4 is provided as an example. Other examples may differ from what is described with regard to FIG. 4.

Load-balancing the packet using the value in the BTH may improve (e.g., optimize) tail latency without consuming excessive hardware resources. By applying per-packet load balancing on certain flows based on destination NICs and/or workload type as identified by the BTH, the network device may reduce re-ordering issues. For example, the network device may reduce tail latency due to re-ordering by performing DLB on flows for which the destination NIC is capable of supporting re-ordering. Additionally, or alternatively, the network device may avoid starving of mice flows by enabling packet spraying for elephant flows. In some examples, enabling DLB with packet spray mode for elephant flows and SLB for mice flows may avoid re-ordering of mice flows, thereby reducing hardware resources consumed by the destination NIC. Therefore, in some examples, the network device may perform efficient ECMP load balancing for RDMA traffic in an AI/ML fabric. Such network performance enhancements, including reducing tail latency, may increase a quantity of workloads and applications that may be run on AI infrastructure, which may help to approach an ideal scenario where an AI backend operates at a 100% utilization rate.

Figure 5:
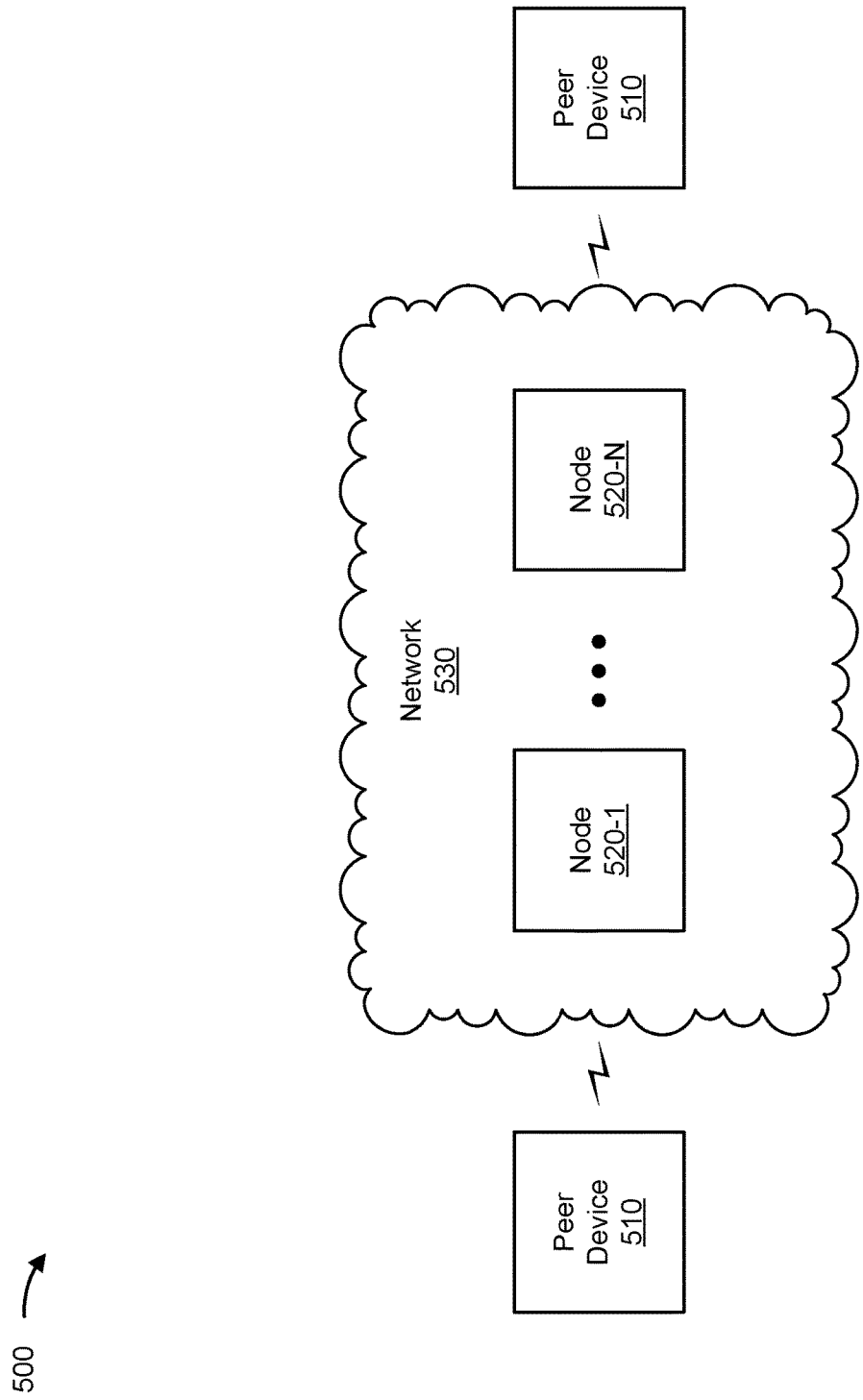
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include one or more peer devices 510, a group of nodes 520 (shown as node 520-1 through node 520-N), and a network 530. Devices of environment 500 may interconnect via wired connections, wireless connections, or a combination of wired and wireless connections.

Peer device 510 includes one or more devices capable of receiving and/or providing network traffic. For example, peer device 510 may include a traffic transfer device, such as a router, a gateway, a switch, a firewall, a hub, a bridge, a reverse proxy, a server (e.g., a proxy server, a server executing a virtual machine, etc.), a security device, an intrusion detection device, a load balancer, or a similar type of device. In some implementations, peer device 510 may include an endpoint device that is a source or a destination for network traffic. For example, peer device 510 may include a computer or a similar type of device, such as a GPU. Peer device 510 may receive network traffic from and/or may provide network traffic (e.g., payload packets) to other peer devices 510 via network 530 (e.g., by routing payload packets using node(s) 520 as an intermediary). In some implementations, peer device 510 may include an edge device that is located at an edge of one or more networks. For example, peer device 510 receive network traffic from and/or may provide network traffic (e.g., payload packets) to devices external to network 530.

Node 520 includes one or more devices capable of receiving, processing, storing, routing, and/or providing traffic (e.g., a payload packet, a file, etc.) in a manner described herein. For example, node 520 may include a router, such as a label switching router (LSR), a label edge router (LER), an ingress router, an egress router, a provider router (e.g., a provider edge router, a provider core router, etc.), a virtual router, or another type of router. Additionally, or alternatively, node 520 may include a gateway, a switch, a firewall, a hub, a bridge, a reverse proxy, a server (e.g., a proxy server, a cloud server, a data center server, etc.), a load balancer, and/or a similar device.

In some implementations, node 520 may be a physical device implemented within a housing, such as a chassis. In some implementations, node 520 may be a virtual device implemented by one or more computer devices of a cloud computing environment or a data center.

In some implementations, node 520 may be configured with one or more segment translation tables. In some implementations, node 520 may receive a payload packet from peer device 510. In some implementations, node 520 may encapsulate the payload packet using a compressed routing header (CRH) and may route the IP payload packet to another node 520, using one or more techniques described elsewhere herein. In some implementations, node 520 may be an edge node in network 530. In some implementations, node 520 may be an intermediary node in network 530 (i.e., a node between two or more edge nodes).

Network 530 includes one or more wired and/or wireless networks. For example, network 530 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN)), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as one or more examples. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
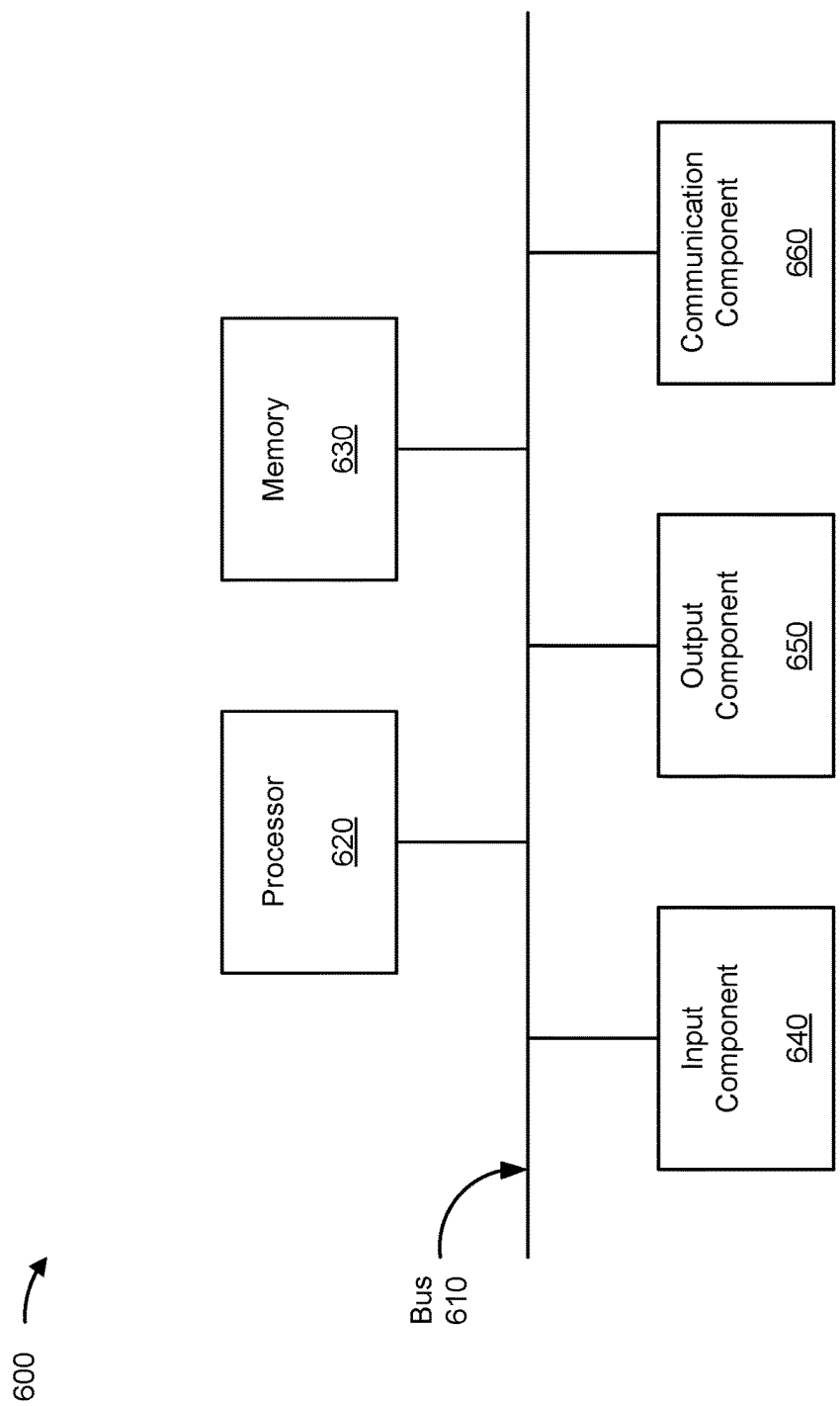
FIG. 6 is a diagram of example components of a device associated with load balancing using a BTH.

FIG. 6 is a diagram of example components of a device 600 associated with load balancing using a BTH. The device 600 may correspond to a node 520. In some implementations, the node 520 may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include RAM, read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

Figure 7:
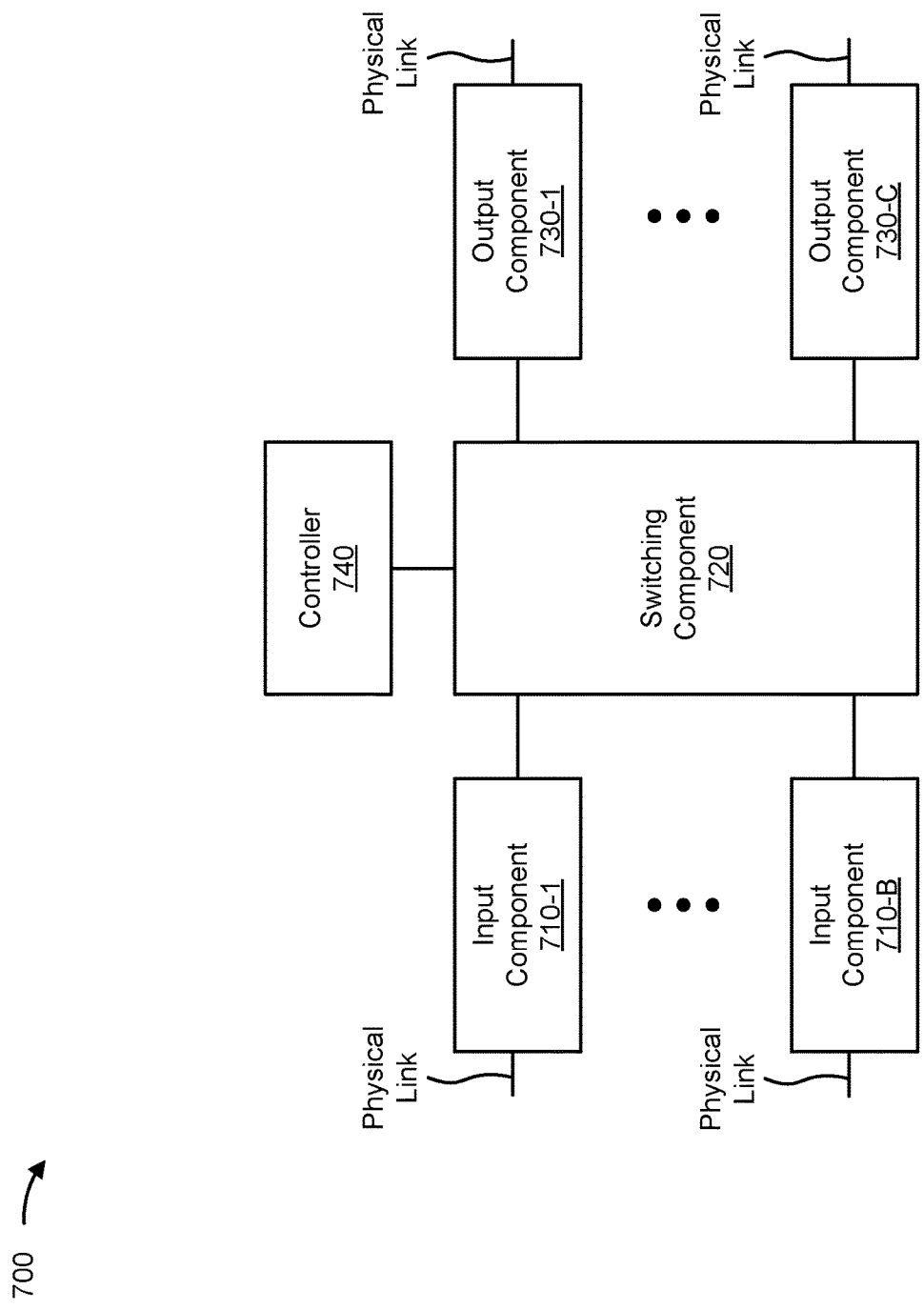
FIG. 7 is a diagram of example components of a device associated with load balancing using a BTH.

FIG. 7 is a diagram of example components of a device 700 associated with load balancing using a BTH. Device 700 may correspond to node 520. In some implementations, node 520 may include one or more devices 700 and/or one or more components of device 700. As shown in FIG. 7, device 700 may include one or more input components 710-1 through 710-B (B≥1) (hereinafter referred to collectively as input components 710, and individually as input component 710), a switching component 720, one or more output components 730-1 through 730-C (C≥1) (hereinafter referred to collectively as output components 730, and individually as output component 730), and a controller 740.

Input component 710 may be one or more points of attachment for physical links and may be one or more points of entry for incoming traffic, such as packets. Input component 710 may process incoming traffic, such as by performing data link layer encapsulation or decapsulation. In some implementations, input component 710 may transmit and/or receive packets. In some implementations, input component 710 may include an input line card that includes one or more packet processing components (e.g., in the form of integrated circuits), such as one or more interface cards (IFCs), packet forwarding components, line card controller components, input ports, processors, memories, and/or input queues. In some implementations, device 700 may include one or more input components 710.

Switching component 720 may interconnect input components 710 with output components 730. In some implementations, switching component 720 may be implemented via one or more crossbars, via busses, and/or with shared memories. The shared memories may act as temporary buffers to store packets from input components 710 before the packets are eventually scheduled for delivery to output components 730. In some implementations, switching component 720 may enable input components 710, output components 730, and/or controller 740 to communicate with one another.

Output component 730 may store packets and may schedule packets for transmission on output physical links. Output component 730 may support data link layer encapsulation or decapsulation, and/or a variety of higher-level protocols. In some implementations, output component 730 may transmit packets and/or receive packets. In some implementations, output component 730 may include an output line card that includes one or more packet processing components (e.g., in the form of integrated circuits), such as one or more IFCs, packet forwarding components, line card controller components, output ports, processors, memories, and/or output queues. In some implementations, device 700 may include one or more output components 730. In some implementations, input component 710 and output component 730 may be implemented by the same set of components (e.g., and input/output component may be a combination of input component 710 and output component 730).

Controller 740 includes a processor in the form of, for example, a central processing unit (CPU), a GPU, an accelerated processing unit (APU), a microprocessor, a microcontroller, a digital signal processor (DSP), an field-programmable gate array (FPGA), an application-specific integrated circuit (ASIC), and/or another type of processor. The processor is implemented in hardware, firmware, or a combination of hardware and software. In some implementations, controller 740 may include one or more processors that can be programmed to perform a function.

In some implementations, controller 740 may include a RAM, a ROM, and/or another type of dynamic or static storage device (e.g., a flash memory, a magnetic memory, an optical memory, etc.) that stores information and/or instructions for use by controller 740.

In some implementations, controller 740 may communicate with other devices, networks, and/or systems connected to device 700 to exchange information regarding network topology. Controller 740 may create routing tables based on the network topology information, may create forwarding tables based on the routing tables, and may forward the forwarding tables to input components 710 and/or output components 730. Input components 710 and/or output components 730 may use the forwarding tables to perform route lookups for incoming and/or outgoing packets.

Controller 740 may perform one or more processes described herein. Controller 740 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 740 from another computer-readable medium or from another device via a communication interface. When executed, software instructions stored in a memory and/or storage component associated with controller 740 may cause controller 740 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

Figure 8:
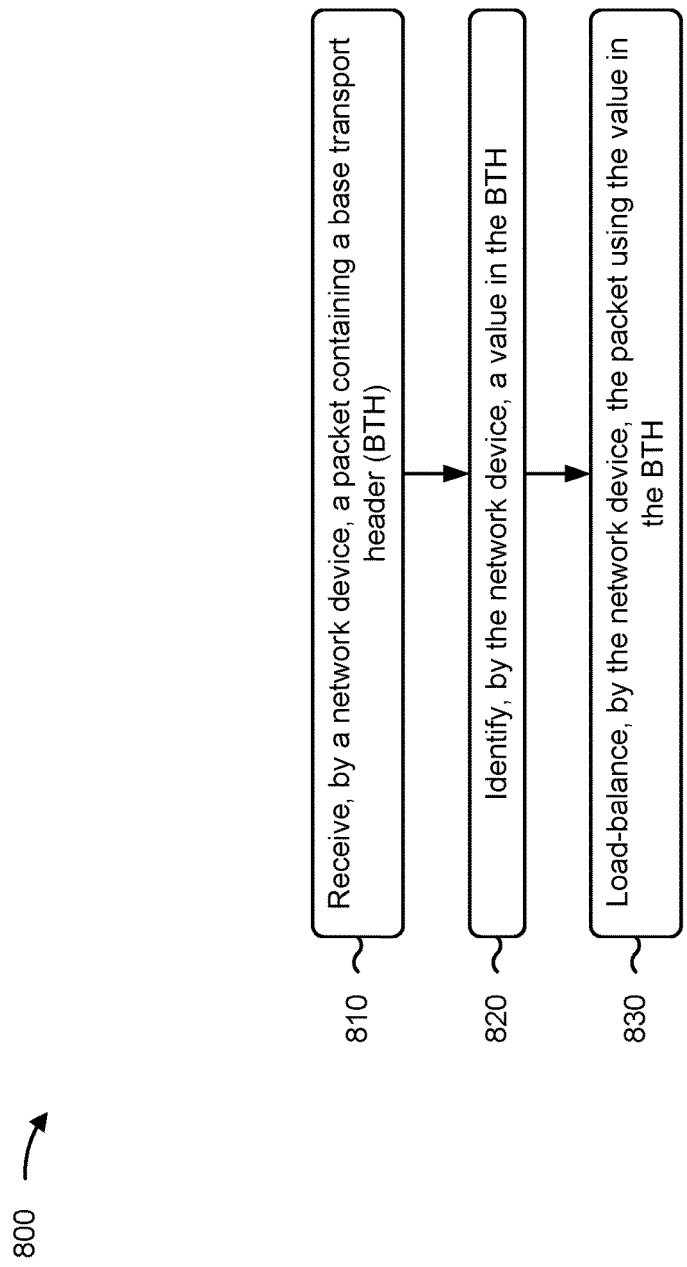
FIG. 8 is a flowchart of an example process associated with load balancing using a BTH.

FIG. 8 is a flowchart of an example process 800 associated with load balancing using a BTH. In some implementations, one or more process blocks of FIG. 8 are performed by a network device (e.g., a network device shown in FIG. 1, such as network device T1). In some implementations, one or more process blocks of FIG. 8 are performed by another device or a group of devices separate from or including the network device, such as a peer device (e.g., peer device 510) and/or a node (e.g., node 520). Additionally, or alternatively, one or more process blocks of FIG. 8 may be performed by one or more components of device 600, such as processor 620, memory 630, input component 640, output component 650, and/or communication component 660, or by one or more components of device 700, such as input component 710, switching component 720, output component 730, and/or controller 740.

As shown in FIG. 8, process 800 may include receiving a packet containing a BTH (block 810). For example, the network device may receive a packet containing a BTH, as described above.

As further shown in FIG. 8, process 800 may include identifying a value in the BTH (block 820). For example, the network device may identify a value in the BTH, as described above.

As further shown in FIG. 8, process 800 may include load-balancing, by the network device, the packet using the value in the BTH (block 830). For example, the network device may load-balance, by the network device, the packet using the value in the BTH, as described above.

Process 800 may include additional implementations, such as any single implementation or any combination of implementations described below and/or in connection with one or more other processes described elsewhere herein.

In a first implementation, the value is in an opcode field of the BTH.

In a second implementation, alone or in combination with the first implementation, the value indicates that the packet is a write-only packet.

In a third implementation, alone or in combination with one or more of the first and second implementations, the value is a packet sequence number in the BTH.

In a fourth implementation, alone or in combination with one or more of the first through third implementations, load-balancing the packet includes selecting a next-hop of the packet.

In a fifth implementation, alone or in combination with one or more of the first through fourth implementations, load-balancing the packet includes steering the packet to a forwarding instance.

In a sixth implementation, alone or in combination with one or more of the first through fifth implementations, process 800 includes performing, by the network device, a networking action on the packet using the value in the BTH or on another packet using a value in a BTH contained in the other packet.

Although FIG. 8 shows example blocks of process 800, in some implementations, process 800 includes additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
  receiving, by a network device, a packet containing a base transport header (BTH);
  identifying, by the network device, a value in the BTH,
    wherein the value in the BTH is in an operation code (opcode) field; and
  load balancing, by the network device, the packet using the value in the BTH,
    wherein the load balancing comprises:
      filtering based on the value in the BTH to determine whether to perform dynamic load balancing or static hash-based load balancing on the packet,
      when the value in the BTH is a predetermined value, performing the dynamic load balancing, and
      when the value in the BTH is not a predetermined value, performing the static hash-based load balancing.

2. The method of claim 1, wherein the value in the BTH indicates that the packet is a write-only packet.

3. The method of claim 1, wherein the value in the BTH is a packet sequence number in the BTH.

4. The method of claim 1, wherein load balancing the packet includes selecting a next-hop of the packet.

5. The method of claim 1, wherein load balancing the packet includes steering the packet to a forwarding instance.

6. The method of claim 1, further comprising:
  performing, by the network device, a networking action on the packet using the value in the BTH or on another packet using a value in another BTH contained in the other packet.

7. The method of claim 1, wherein the load balancing further comprises:
  enabling dynamic load balancing (DLB) for a first type of traffic flow, and
  enabling static load balancing (SLB) for a second type of traffic flow.

8. A network device, comprising:
  one or more memories; and
  one or more processors to:
    receive a remote direct memory access (RDMA) packet containing a base transport header (BTH);
    identify a value in the BTH,
      wherein the value in the BTH is in an operation code (opcode) field; and
    load balance, by the network device, the RDMA packet using the value in the BTH,
      wherein the one or more processors, to load balance the RDMA packet, are to:
        filter based on the value in the BTH to determine whether to perform dynamic load balancing or static hash-based load balancing on the RDMA packet,
        when the value in the BTH is a predetermined value, perform the dynamic load balancing, and
        when the value in the BTH is not a predetermined value, perform the static hash-based load balancing.

9. The network device of claim 8, wherein the value in the BTH indicates that the RDMA packet is a write-only packet.

10. The network device of claim 8, wherein the value in the BTH is a packet sequence number in the BTH.

11. The network device of claim 8, wherein the one or more processors, to load balance the RDMA packet, are to select a next-hop of the RDMA packet.

12. The network device of claim 8, wherein the one or more processors, to load balance the RDMA packet, are to steer the RDMA packet to a forwarding instance.

13. The network device of claim 8, wherein the one or more processors are further to:
  perform a networking action on the packet using the value in the BTH or on another packet using a value in another BTH contained in the other packet.

14. The network device of claim 8, wherein the one or more processors, to load balance, are further to:
  enable dynamic load balancing (DLB) for a first type of traffic flow, and
  enable static load balancing (SLB) for a second type of traffic flow.

15. A non-transitory computer-readable medium storing a set of instructions, the set of instructions comprising:
  one or more instructions that, when executed by one or more processors of a network device, cause the network device to:

receive a packet containing a base transport header (BTH);

identify a value in an operation code (opcode) field of the BTH; and load balance the packet using the value in the BTH, wherein the one or more instructions, that cause the network device to load balance, cause the network device to:

filter based on the value in the BTH to determine whether to perform dynamic load balancing or static hash-based load balancing on the packet, when the value in the BTH is a predetermined value, perform the dynamic load balancing, and when the value in the BTH is not a predetermined value, perform the static hash-based load balancing.

16. The non-transitory computer-readable medium of claim 15, wherein the value in the BTH indicates that the packet is a write-only packet.

17. The non-transitory computer-readable medium of claim 15, wherein the one or more instructions that cause the network device to load-balance the packet include one or more instructions that cause the network device to load-balance the packet using a packet sequence number in the BTH.

18. The non-transitory computer-readable medium of claim 15, wherein the one or more instructions, that cause the network device to load balance, cause the network device to:

select a next-hop of the packet.

19. The non-transitory computer-readable medium of claim 15, wherein the one or more instructions, that cause the network device to load balance, cause the network device to:

steer the packet to a forwarding instance.

20. The non-transitory computer-readable medium of claim 15, wherein the one or more instructions further cause the network device to:

perform a networking action on the packet using the value in the BTH or on another packet using a value in another BTH contained in the other packet.

* * * * *